United States Patent [19]

Oyaizu

[11] Patent Number: 5,797,593
[45] Date of Patent: Aug. 25, 1998

[54] GAS SPRING

[75] Inventor: Hiroshi Oyaizu, Shizuoka, Japan

[73] Assignee: Showa Coporation, Gyoda, Japan

[21] Appl. No.: 753,996

[22] Filed: Dec. 4, 1996

[30] Foreign Application Priority Data

Dec. 6, 1995 [JP] Japan .................................. 7-344394

[51] Int. Cl.$^6$ ........................................................ F16F 5/00
[52] U.S. Cl. ............................ 267/64.12; 188/322.17; 188/322.19
[58] Field of Search ......................... 267/64.12, 64.15, 267/120; 188/284, 296, 300, 322.17, 322.18, 322.19; 92/222, 223, 168, 170

[56] References Cited

U.S. PATENT DOCUMENTS

| 4,066,279 | 1/1978 | Kaptanis . |
| 4,078,638 | 3/1978 | Koyama et al. ............. 188/322.19 X |
| 4,298,101 | 11/1981 | Dressell, Jr. et al. ............ 267/217 X |
| 4,595,182 | 6/1986 | Freitag ........................... 267/120 |
| 4,688,808 | 8/1987 | Iijim ............................. 92/233 X |

FOREIGN PATENT DOCUMENTS

| 2305645 | 10/1976 | France . |
| 2349767 | 11/1977 | France . |
| 3133144 | 3/1983 | Germany . |
| 3301544 | 7/1984 | Germany . |
| 3332216 | 3/1985 | Germany . |
| 53-1764 | 1/1978 | Japan . |
| 54-112439 | 9/1979 | Japan . |
| 375327 | 7/1991 | Japan . |
| 1577079 | 10/1980 | United Kingdom . |

*Primary Examiner*—Robert J. Oberleitner
*Assistant Examiner*—Pamela J. Lipka
*Attorney, Agent, or Firm*—Dvorak & Orum

[57] ABSTRACT

There is provided a gas spring 20 in which: a cylinder groove 29 is formed on an inner surface of a cylinder 21 slidably arranging a piston 23 therein, the piston 23 being fixed at one end of a rod 22 and the cylinder groove 29 extending in an axial direction of the cylinder throughout the range of piston stroke except an area nearby a stopper 30; and an airlock chamber is definable nearby the stopper of the cylinder so that damping operation can be performed when being fully extended at the end of the extending process, characterized in that the cylinder groove is a square groove having a substantially square cross section with a constant groove width W and a groove depth H gradually reduced toward an area nearby the stopper.

2 Claims, 11 Drawing Sheets

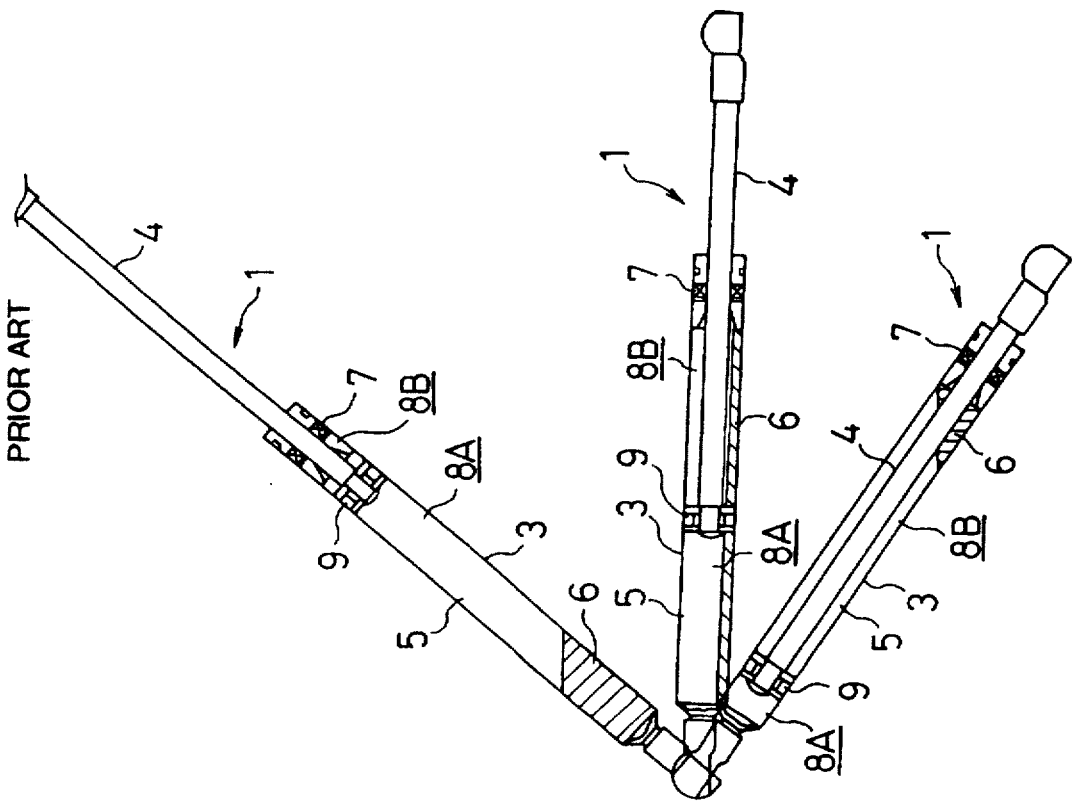
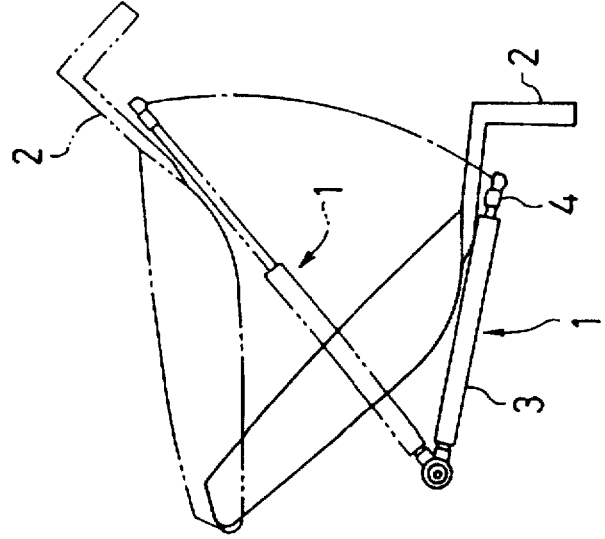

GAS SPRING

This application incorporates by reference the applicant's co-pending application, Ser. No. 08/760,781, filed on the same day as this application.

BACKGROUND OF THE INVENTION

1. Field of the Invention

This invention relates to a gas spring used in a back door or trunk lid of a four-wheel vehicle or the like.

2. Discussion of the Background Art

A four-wheel vehicle generally has back doors or trunk doors or lids, each capable of opening and closing along or around a horizontal axis of the car body. The back door is mounted onto the car body through a gas spring so that the force required for opening the back door can be reduced by the assisting force of the gas spring.

One form of often used gas springs is an inverted gas spring, which has a cylinder at the upper side and a rod at the lower side when the back door is closed. The inverted gas spring is classified into two types, depending on the method of mounting the gas spring between the back door and the car body. One is an inverted force type shown in FIGS. 13A to 13C of the drawings. The other is an inverted position turning type shown in FIGS. 14A and 14B.

In a gas spring 1 of inverted force type shown in FIGS. 13A to 13C, which is mainly used in a back door of four-wheel vehicles such as a station-wagon, a cylinder 3 is attached to the back door 2 and a rod 4 is attached to the car body so as to keep the cylinder 3 and the rod 4 substantially in a vertical position. In this case, the cylinder 3 and the rod 4 does not change their positions irrespective of whether the back door 2 is open or closed.

In a gas spring 1 of inverted position turning type shown in FIGS. 14A and 14B, which is used in a back door 2 of a passenger car, the cylinder 3 is attached to the car body and the rod 4 is attached to the back door 2 so as to position the gas spring at an angle when the back door 2 is closed. In this case, the cylinder 3 and the rod 4 turn their position between open and closed states of the back door 2.

These inverted type gas springs 1 have been widely used due to an excellent sealing property so that a gas 5 can be enclosed tightly within the cylinder 3. The gas 5 is enclosed within the cylinder 3 together with a small amount of oil 6. In the inverted gas spring 1 of FIG. 13, the oil 6 remains in the lower portion of the cylinder 3 when the back door 2 is closed, and a gas seal 7 arranged in the lower opening is lubricated by the oil 6, so that the gas 5 enclosed within the cylinder 3 is sealed with the gas seal 7.

As shown in FIG. 15A with the above inverted gas spring 1, during compression, the gas 5 enclosed in a piston-side chamber 8A flows into a rod-side chamber 8B through an outer passage 10 around a piston 9 and an orifice 11, so that little or no damping force is generated, thereby enabling the back door 2 to close quickly.

FIG. 15B shows the process of extending the gas spring 1, in which an outer piston-ring 12 around the piston 9 blocks the outer passage 10, and thereby the gas 5 within the rod-side chamber 8B flows into the piston-side chamber 8A only through the orifice 11 of the piston 9, so that extension damping force occurs. In the process of extending the gas spring 1, extension assisting force acts on the rod 4. The assisting force exerted to the gas spring 1 by pressure of the enclosed gas 5 in the piston-side chamber 8A (reaction force of the gas), causes transit speed (or extension speed) of the rod 4 to be controlled by that extension damping force to push up the back door 2 at proper speed.

Further, FIG. 13C shows a state of the gas spring 1 when the gas spring 1 has been fully extended. The oil 6 within the cylinder 3 flows through the orifice 11 of the piston 9 to produce large damping resistance, and thereby the fully extended gas spring 1 is damped.

As discussed above, the use of the oil 6 to perform damping operation when being fully extended does not cause any inconvenience to the gas spring 1 of inverted force type shown in FIGS. 13A to 13C, whereas the following problems (1) through (4) are present in the gas spring 1 of inverted position turning type shown in FIGS. 14A and 14B.

(1) Since the cylinder 3 and the rod 4 turn their positions to locate the cylinder 3 at the lower side and the rod 4 at the upper side as the back door 2 is opened, the oil 6 within the rod-side chamber 8B enters near the turned position and flows through the orifice 11 of the piston 9 into the piston-side chamber 8A. Thereby the rod-side chamber 8B is put into an oil deficient state in a full extension area. As a result, the gas spring 1 can not be damped sufficiently, and therefore a problem arises because the piston 9 heavily collides with the opening end of the cylinder 3 and transmits vibrations to the car body.

(2) When the back door 2 is opened again after closing the back door 2 to a position slightly above the turned position, the oil 6 moves to the piston-side chamber 8A and the rod-side chamber 8B is put into an oil deficient state. As a result, the gas spring 1 can not be damped sufficiently when being fully extended, and the same problem arises in that the piston 9 heavily collides with the opening end of the cylinder 3.

(3) When the back door 2 is opened, the oil 6 within the rod-side chamber 8B enters near the turned position and starts flowing toward the piston-side chamber 8A, so that the oil 6 flows through the orifice 11 to increase the gas-flow resistance, and hence the extension damping force. This causes slow-down of the extending operation of the rod 4 and the opening operation of the back door 2.

(4) Since the oil 6 affects the extension damping force, the extension damping force may vary with various conditions, such as amount of the oil 6, temperature of oil 6, position of the gas spring 1, and reaction force of the enclosed gas 5.

To solve the above problems, Japanese Patent Laid-Open Application (JP-A) No. 53-1764 discloses a gas spring 13, as shown in FIG. 16, which is damped due to an action of only a gas (air) when being fully extended. The gas spring 13 encloses a very small amount of oil 6 only enough to lubricate the gas seal 7. The gas spring 13 includes: cylinder grooves 15, which are formed in an axial direction of a cylinder 14 by notching the inner surface of the cylinder 14 so that the piston-side chamber 8A and the rod-side chamber 8B can communicate with each other; and an inner orifice 17A and an outer orifice 17B formed through a piston 16.

In the gas spring 13, the gas 5 enclosed within the piston-side chamber 8A flows into the rod side chamber 8B, during the compression processing, through the cylinder grooves 15, the inner orifice 17A and the outer orifice 17B, so that little or no damping force occurs. In the extending process, since a lip 18 provided on the piston 16 blocks the outer orifice 17B, and the gas 5 within the rod-side chamber 8B flows into the piston-side chamber 8A through the cylinder grooves 15 and the inner orifice 17A, an extension damping force occurs. When the gas spring 13 has been fully extended at the end of the extending process, the piston 16 comes to an airlock area where no cylinder groove 15 is formed, to define an airlock chamber with the gas seal 7 provided at the opening end of the cylinder 14, the rod guide 19 and the piston 16. Therefore the fully extended gas spring 13 is damped (air-locked) only by the flow resistance of the gas 5 flowing through the inner orifice 17A.

There is also known a triangular groove for use as the cylinder groove 15 of the above gas spring 13, as shown in FIGS. 17A and 17B, which has a V or triangular shape expanded out of the cylinder 14. The triangle-shaped cylinder groove 15 is formed to gradually reduce its groove width w and depth h toward the extension end of the gas spring 13 so as to prevent damping operation from starting suddenly when the gas spring 13 has been fully extended.

However, when using such a triangular groove as the cylinder groove 15, since the sectional area $S_1$ of the triangular groove (FIGS. 17A and 17B) is formed into a double proportional shape by being tapered toward the airlock area of the cylinder 14 sharply in proportion to both the groove depth h and width w in the area that the triangular groove depth h and the groove width w begin to reduce, the rate of change in the sectional area $S_1$ of the triangular groove is high (the dashed line $A_1$ in FIG. 9) and causes rapid (doubly) change (increase) in the damping force when the gas S flows through the triangular groove. For this reason, the use of the triangular groove as the cylinder groove 15 causes the gas spring 13 to increase the damping force suddenly, i.e., to be damped suddenly, in the area that the sectional area of the cylinder groove 15 reduces, so that the extension speed of the piston 16 is suddenly slowed down to increase the impact when the piston 16 rushes to the reduction area of the sectional area of the cylinder groove 15.

FIG. 18 is a graph showing the relationship in the gas spring 13 with stroke $L_1$ of the piston 16 chosen as the ordinate. Impact acceleration $G_1$ which acts on the back door 2 mounting of the gas spring 13 is the ordinate and time is the abscissa. Referring to the graph, the piston stroke $L_1$ increases in the process of extending the gas spring 13 and the extension speed of the piston 16 is suddenly slowed down at point $a_1$ in the air-damping reduction area Y just before the piston 16 enters the airlock area X, and thereby a suddenly increased impact acceleration of 0.4G acts on the back door 2.

SUMMARY OF THE INVENTION

The present invention has been made to overcome the above problems and an object thereof is to provide a gas spring capable of slowing down damping operation when a piston approaches being fully extended to reduce the impact when being fully extended.

In the invention, there is provided a gas spring in which: seal and guide members are arranged in an opening provided at one end of a cylinder enclosing a gas therein, the other end of the cylinder being closed; a rod having a piston at one end thereof is slidably arranged within the cylinder together with the piston through the seal and guide members; force applying means is provided within the cylinder to force the rod in an extending direction; a seal member is set in the outer edge of the piston to divide the cylinder into a rod-side chamber and a piston-side chamber; a cylinder groove is formed on the inner surface of the cylinder in an axial direction throughout the range of piston stroke except an area nearby an extension end, such that extension damping force occurs while the gas flows from the rod-side chamber through the cylinder groove into the piston-side chamber in an extending process; and an airlock chamber is definable among the piston, and the seal and guide members nearby the extension end of the cylinder so that damping operation can be performed when being fully extended at the end of the extending process, wherein the cylinder groove is a square groove having a substantially square cross section with a constant groove width and a groove depth gradually reduced toward an area nearby the extension end.

The groove depth of the cylinder is formed to be curved along the axial direction toward the extension end of the cylinder. A passage formed in the piston to communicate between the rod-side chamber and the piston-side chamber, and a check valve is arranged to open the passage only in the compressing process.

In another embodiment, there is provided a gas spring in which: seal and guide members are arranged in an opening provided at one end of a cylinder enclosing a gas therein, the other end of the cylinder being closed; a rod having a piston at one end thereof is slidably arranged within the cylinder together with the piston through the seal and guide members, the cylinder being divided by the piston into a rod-side chamber and a piston-side chamber; force applying means is provided within the cylinder to force the rod in an extending direction; an annular passage is formed between the inner surface of the cylinder and the outer edge of the piston to communicate between the chambers at both sides of the piston, an annular groove is formed around the outer piston, and a check valve is arranged in the annular groove to open the annular passage only in the compressing process; a cylinder groove is formed in an axial direction of the cylinder throughout the range of piston stroke except an area nearby an extension end, such that extension damping force occurs while the gas flows from the rod-side chamber through the cylinder groove into the piston-side chamber in an extending process; and an airlock chamber is definable among the piston, and the seal and guide members nearby the extension end of the cylinder so that damping operation can be performed when being fully extended at the end of the extending process, wherein the cylinder groove is a square groove having a substantially square cross section with a constant groove width and a groove depth gradually reduced toward an area nearby the extension end. An O-ring comprises the check valve mentioned above.

Since the cylinder groove is formed to be a square groove having a substantially square cross section with a constant groove width and a groove depth gradually reduced toward an area nearby the extension end, the rate of change in sectional area, by which the groove depth is reduced toward the area nearby the extension end, becomes small. In the extending process of the gas spring, this makes it possible to slow down the damping operation when the piston rushes to the air-damping reduction area, and hence to reduce the impact when rushing to the air-damping reduction area.

The groove depth of the cylinder groove is formed to be curved along the axial direction toward the area nearby the extension end, so that the rate of change in sectional area of the cylinder groove becomes further small. For this reason, the damping operation is further slowed down when the piston rushes to the air-damping reduction area to further reduce the impact when rushing to the air-damping reduction area.

The passage formed in the piston member is opened by the check valve only in the compressing process, so that little or no damping force can occur in this compressing process, thus compressing the gas spring quickly.

An annular passage is formed between the inner surface of the cylinder and the outer edge of the piston to communicate between the chambers at both sides of the piston, the annular groove is formed around the outer piston, a check valve is arranged in the annular groove to open the annular passage only in the compressing process, and the groove is formed on the inner surface of the cylinder, so that the piston can be formed with a solid-core structure without orifice hole or orifice groove. Even when the O ring as a check valve is arranged in the annular groove around the outer piston, the square groove of the cylinder is never made narrow by letting the O ring bite thereinto, so that proper extension damping force can be obtained by the square-shaped cylinder groove.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings:

FIGS. 13A to 13C are diagrams showing a conventional gas spring of inverted force type, in which FIG. 13A is a plan view showing a state when being mounted, and FIGS. 13B and 13C are sectional views;

FIGS. 14A and 14B are diagrams showing a conventional gas spring of inverted position turning type, in which FIG. 14A is a plan view showing a state when being mounted, and FIG. 14B is a sectional view;

FIGS. 17A and 17B are diagrams showing a case a triangular groove is used as the cylinder groove of FIG. 16, in which FIG. 17A is a sectional view and FIG. 17B is a schematic perspective view.

DESCRIPTION OF THE PREFERRED EMBODIMENTS

Figure 1:
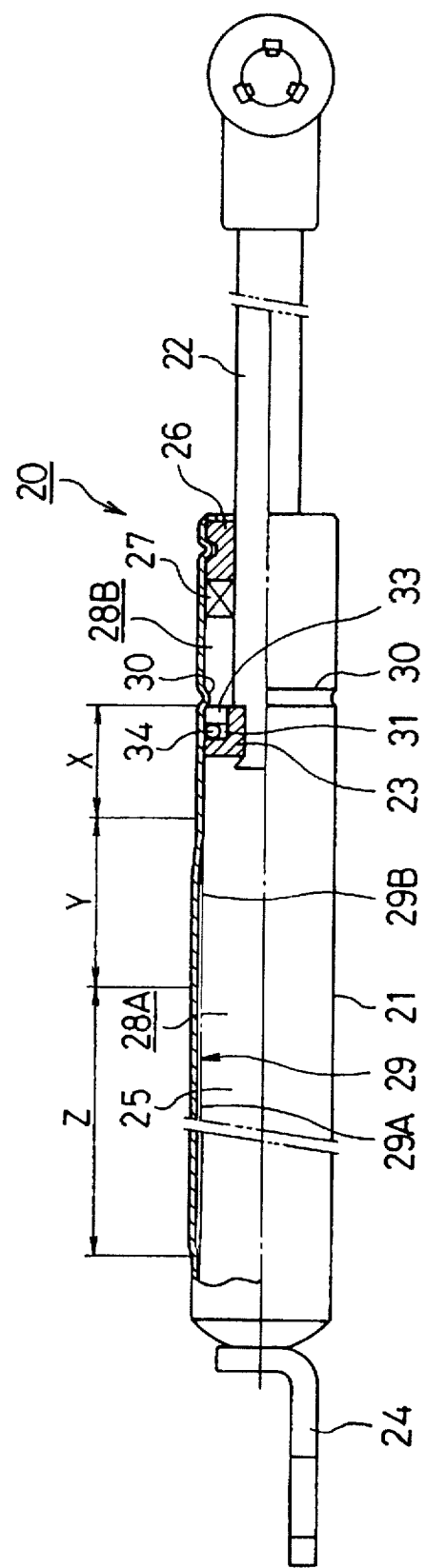
FIG. 1 is a partial sectional-view showing an embodiment of a gas spring according to the present invention.

FIG. 1 shows a gas spring 20 used for a door of a four-wheel vehicle and mainly used for a gas spring of inverted position turning type. The gas spring 20 has a piston 23 slidably within a cylinder 21, one end of the cylinder 21 being closed and the piston being fixed by applying pressure to one end of a rod 22. A bracket 24 of the cylinder 21 is attached to the car body. The other end of the rod 22 is attached to a back or trunk door thereof.

A gas or air 25 is enclosed within the cylinder 21, and a rod guide 26 and a gas seal 27 are arranged in an opening portion provided at the other end of the cylinder 21. The rod guide 26 leads the rod 22 to move as the piston 23 slides through the cylinder 21, while the gas seal 27 prevents a leak of the air 25. A very small amount of oil is also enclosed within the cylinder 21 so that the gas seal 27 can be lubricated sufficiently to maintain good sealing characteristics.

The cylinder 21 is divided by the piston 23 into two sections, one is a rod-side chamber 28B in which the rod 22 is housed. The other is a piston-side 28A chamber in which the rod 22 is not housed. The air 25 is enclosed in both the chambers 28A and 28B. A pressure of the air 25 (reaction force of the air) in the piston-side chamber 28A or the rod-side chamber 28B is in proportion to a pressure-receiving area of the piston 23. Therefore, the reaction force in the piston-side chamber 28A is larger by a sectional area of the rod 22 than the rod-side chamber 28B. For this reason, the above reaction forces act as a force (assisting force) to force the piston 23 in an extending direction of the gas spring 20, i.e., the air 25 serves as force applying means.

Figure 2:
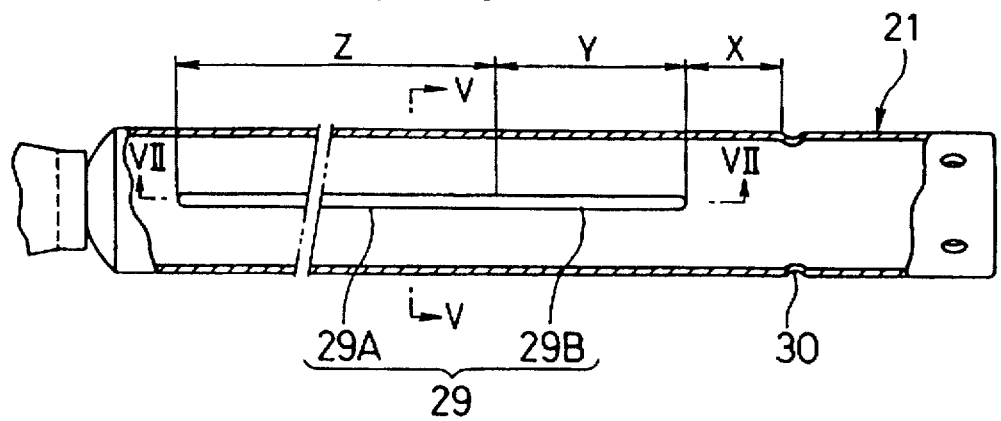
FIG. 2 is a sectional view showing a cylinder of FIG. 1.

As shown in FIGS. 1 and 2, a cylinder groove 29 is formed on the inner surface of the cylinder 21. The cylinder groove 29 is formed by externally extending the inner surface of the cylinder 21 using plastic working such as roll forming. In the cylinder 21, a stopper 30 is also provided nearby the position where the rod guide 26 and the gas seal 27 are located, thereby reducing the diameter of the cylinder 21 centrally. The piston 23 strikes the stopper 30 and stops moving forward under control of the stopper 30. The position of the piston 23 striking the stopper 30 is an extension end. The cylinder groove 29 is formed to extend in the axial direction of the cylinder 21 substantially throughout the full range of piston 23 stroke except for an area nearby the extension end.

One end of the cylinder groove 29, which is a closed-end side of the cylinder 21, extends from the position where an O-ring 34 is located. The O-ring 34 is used as a seal member set in the outer edge of the piston 23 when the gas spring 20 is most compressed. The O-ring 34 divides the cylinder 21 into the chambers 28A and 28B provided at both sides of the piston 23 and communicates between the chambers 28A and 28B through cylinder groove 29 even when the gas spring 20 is most compressed. The cylinder groove 29 may be extended to the closed end of the cylinder 21.

Figure 3:
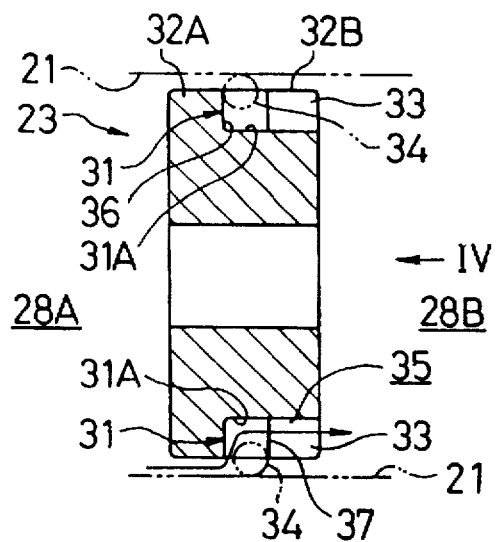
FIG. 3 is a sectional view showing a piston of FIG. 1.
Figure 4:
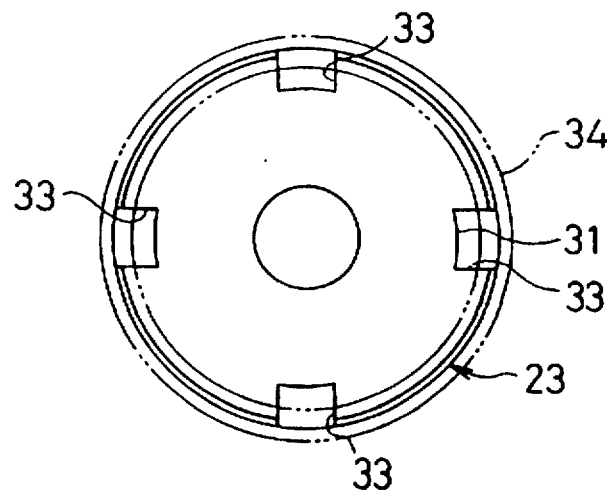
FIG. 4 is a diagram showing the piston of FIG. 3 as viewed from the plane indicated by the arrow IV.
Figure 5:
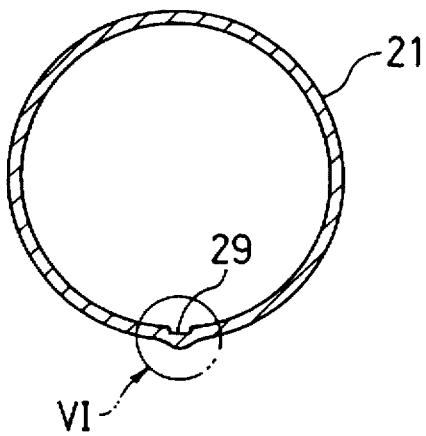
FIG. 5 is a sectional view taken along the plane of line V—V of FIG. 2 showing the cylinder that has rotated 90 degree.
Figure 6:
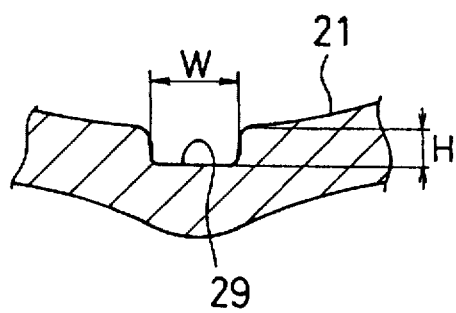
FIG. 6 is an enlarged sectional-view showing the portion VI of FIG. 5.
Figure 7:
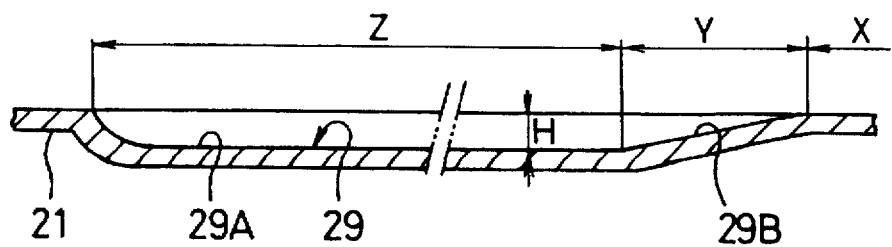
FIG. 7 is a sectional view taken along the plane of line VII—VII of FIG. 2.

In the piston 23, as shown in FIGS. 3 and 4, an annular groove 31 is formed by cutting so that the outer edge of the piston 23 will be divided into a first flange 32A and a second flange 32B, and a notch 33 is formed on the second flange 32B so that the annular groove 31 and the rod-side chamber 28B can communicate with each other. In other words, the annular groove 31 is formed between the first flange 32A and a remaining portion of the second flange 32B in which the notch 33 is not formed. The O-ring 34 is then set in the annular groove 31 and used as an elastic seal member.

The O-ring 34 comes closely into contact with the inner surface of the cylinder 21 and set in the annular groove 31 such that a clearance is left between the O-ring 34 and the bottom 31A of the annular groove 31. As a result, a passage 35 is defined among the outer edge of the first flange 32A of the piston 23, the annular groove 31, the notch 33 and the inner surface of the cylinder 21. The O-ring 34 serves as a check valve, which strikes the wall 36 of the first flange 32A to close the passage 35 in the process of extending the gas spring 20, or which strikes the wall 37 of the second flange 32B to open the passage 35 in the process of compressing the gas spring 20.

When the gas spring 20 is extended, the passage 35 of the piston 23 is closed by the O-ring 34, and the air 25 of the rod-side chamber 28B flows into the piston-side chamber 28A only through the cylinder groove 29, so that extension damping force is generated by a flow resistance caused when the air 25 passes through the cylinder groove 29. In the process of extending the gas spring 20, the assisting force acts on the piston 23 and the rod 22 by reaction force of the air passed into the piston-side chamber 28A to move the piston 23 and the rod 22 in the extending direction. At this time, the extension speed of the piston 23 and the rod 22 is controlled properly by the extension damping force.

When the gas spring 20 is compressed, the passage 35 of the piston 23 is secured, and the air 25 within the piston-side chamber 28A flows into the rod-side chamber 28B through both the passage 35 and the cylinder groove 29, so that little or no damping force occurs in this compressing process, thus compressing the gas spring 20 quickly.

As shown in FIG. 2, the cylinder groove 29 is formed substantially throughout the full range of piston 23 stroke except for an area nearby the stopper 30 (the area without cylinder groove 29). The area nearby the stopper 30 of the piston 23 is an airlock area X. The cylinder groove 29 is constituted, as shown in FIGS. 5 through 8A, by connecting two sections 29A and 29B, one section 29A being formed into a square groove having a square cross-section with constant width W and depth H, and the other section 29B being tapered off toward the airlock area X of the piston 23. In the cylinder 21, the area corresponding to the section 29A which has a constant groove-depth H is used as an air damping area Z, while the area corresponding to the section 29B, the groove-depth H of which is tapered, is used as an air-damping reduction area Y.

In the process of extending the gas spring 20, when the piston 23 is in the air damping area Z, the rod 22 and the piston 23 move in the extending direction due to an action of the assisting force (reaction force of the air) from the piston-side chamber 28A, and the extension speed is controlled properly by the extension damping force of air moved through the cylinder groove 29.

Further, in the process of extending the gas spring 20, when the piston 23 is in the airlock area X, the piston 23, O-ring 34, the cylinder 21, the gas seal 27 and the rod guide 26 define an airlock chamber to move the piston 23 in the extending direction very slowly, described later, thus performing damping operation properly when the gas spring 20 has been fully extended.

Figure 9:
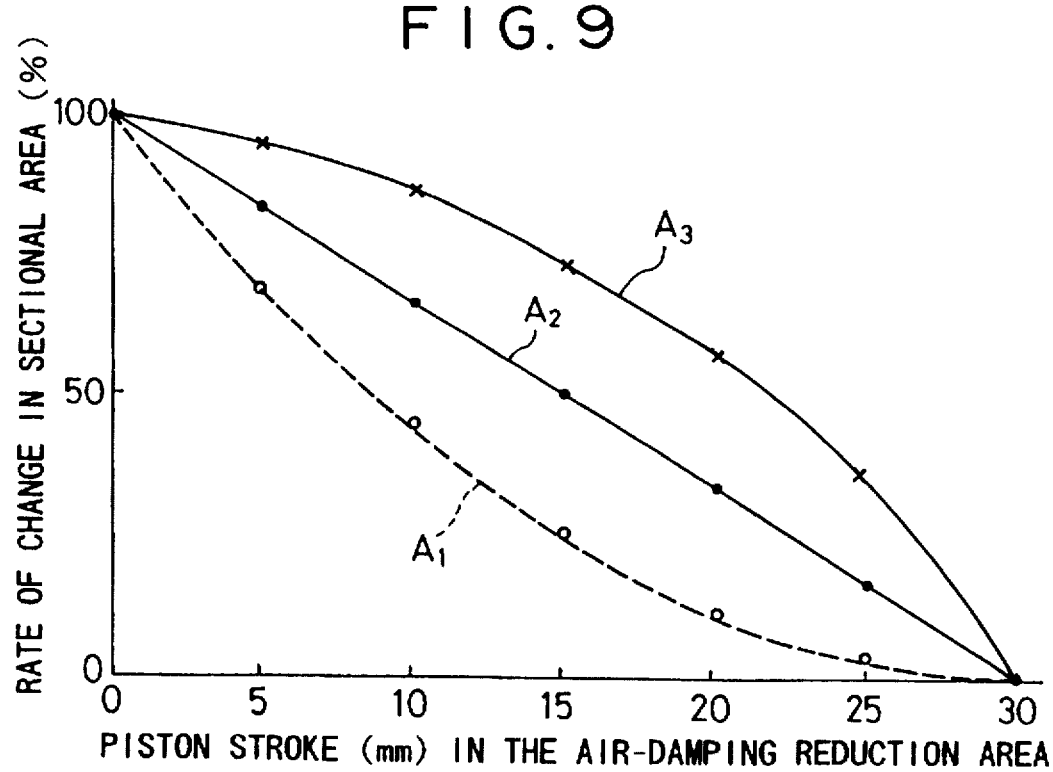
FIG. 9 is a graph showing the relationship between the rate of change in sectional area of the cylinder groove and the piston stroke in an air-damping reduction area.

Furthermore, in the process of extending the gas spring 20, when the piston 23 is in the air-damping reduction area Y, the sectional area of the cylinder groove 29 (29B) is reduced primarily in proportion to only the depth of the cylinder groove 29 (29B), as indicated by the solid curve $A_2$ in FIG. 9. For this reason, the piston 23 does not decelerate suddenly when the piston 23 rushes from the air damping area Z into the air-damping reduction area Y, compared with the conventional gas spring which has V-shaped cylinder grooves.

Figure 8A:
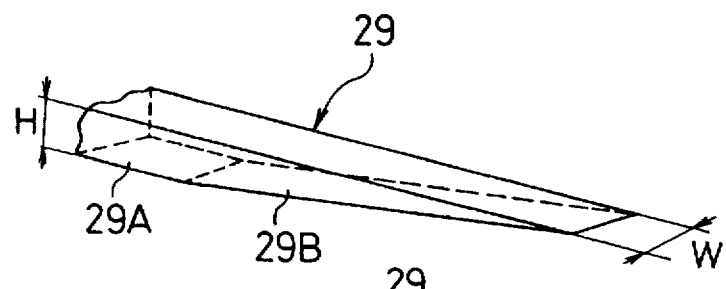
FIGS. 8A and 8B are perspective views showing a cylinder groove schematically.
Figure 8B:
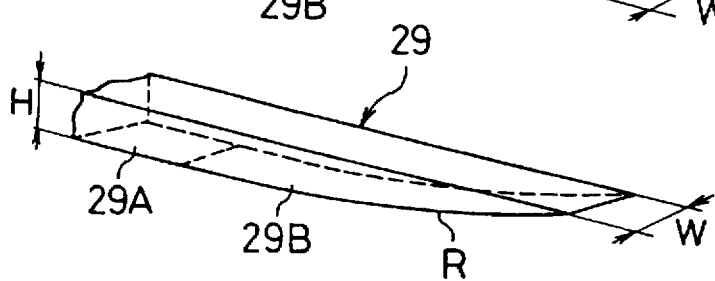
Figure 18:
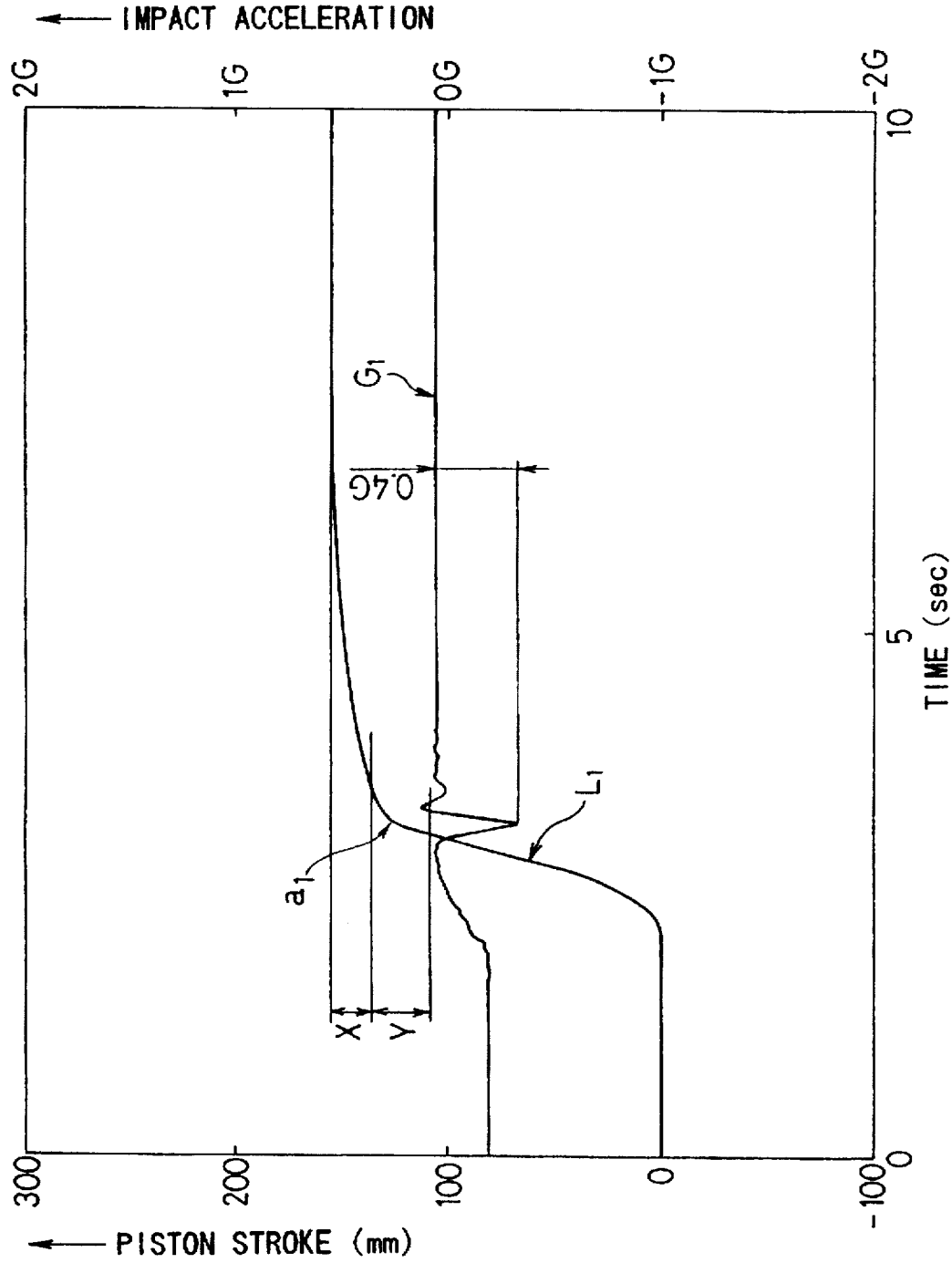
FIG. 18 is a graph showing the relationship among piston stroke, impact acceleration and time in a gas damper forming the triangle-shaped cylinder groove therein.

The cylinder groove 29 (29B) in the air-damping reduction area Y of the gas spring 20 may be formed, as shown in FIG. 8B, such that the groove depth H is tapered while bending toward the airlock area X along the axial direction of the cylinder 21 (bend R in FIG. 8B). In this case, since the sectional area of the cylinder groove 29 (29B) of the gas spring 20, which is in the air-damping reduction area Y, varies (decreases) with $\frac{2}{3}$ power in the process of extending the gas spring 20, as indicated by the solid curve $A_3$ in FIG. 9, when rushing from the air damping area Z into the air-damping reduction area Y, the piston 23 is slowed down more gradually than the case indicated by the solid curve $A_2$. As indicated by the piston stroke $L_2$ in FIG. 10, when rushing from the air damping area Z into the air-damping reduction area Y, the piston 23 is decelerated while tracing a smooth curve in the air-damping reduction area Y, and thereby the impact acceleration $G_2$ of the gas spring 20 that acts on the door is reduced to 0.2 G or less. In contrast, the conventional triangular groove is slowed down very suddenly at point $a_1$, as shown by the characteristic curve in FIG. 18, to cause large impact near the point $a_1$ with an impact acceleration of 0.4 or more.

As shown in FIG. 3, the piston 23 is a solid-core member without any passage such as orifice therethrough, and which is made from sintered alloy, such as iron-sintered alloy, is porous (not shown) for communicating between the piston-side chamber 28A and the rod-side chamber 28B. Open pores are formed by controlling the density of the material of the piston 23 that has been molded from powders. For example, when the inside diameter of the cylinder 21 is 16 mm, 20 mm or 25 mm, the density of the iron-sintered alloy from which the piston 23 is made is set to $6.6 \pm 0.15$ gr/cm$^3$ for obtaining the best airlock characteristic.

When the piston 23 enters the airlock area X in the process of extending the gas spring 20, since the O-ring 34 is closely in contact with the inner surface of the cylinder 21, the air 25 within the rod-side chamber 28B flows into the piston-side chamber 28A through the open pores of the piston 23 that is made from sintered alloy. For this reason, the extension speed of the piston 23 becomes very low, as mentioned above, after the piston 23 has rushed into the airlock area X until being fully extended. When being fully extended, the gas spring 20 is properly damped without rebound shock. Since the air in the airlock chamber is vented to the piston-side chamber 28A through the open pores of the piston 23 that is made from sintered alloy, uniform, stable airlock characteristics can be obtained.

Figure 12:
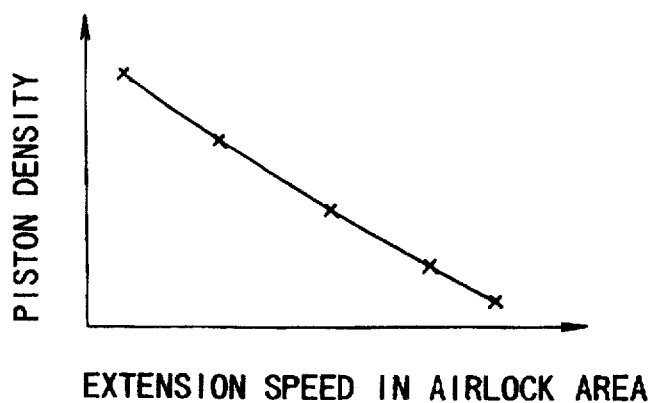
FIG. 12 is a graph showing the relationship between the piston density and the extension speed in an airlock area.
Figure 13C:
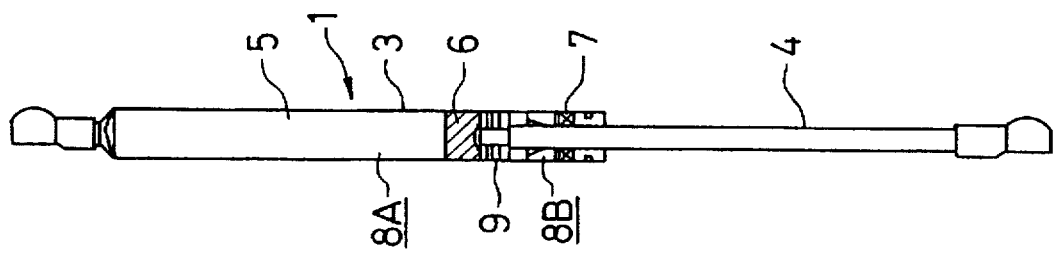
Figure 13B:
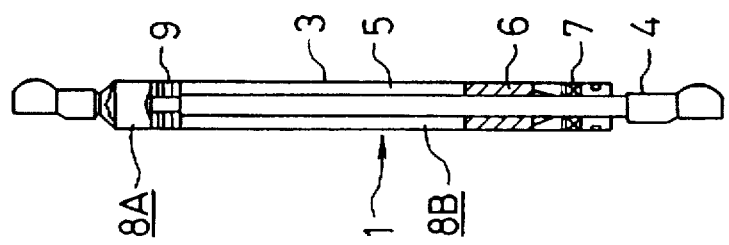
Figure 13A:
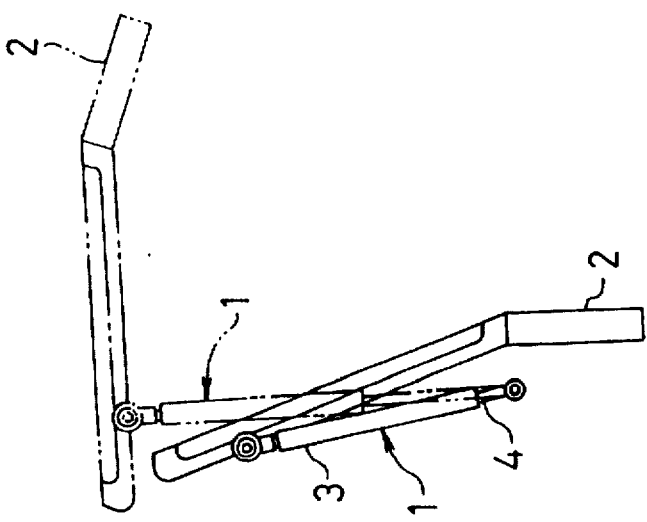
Figure 15A:
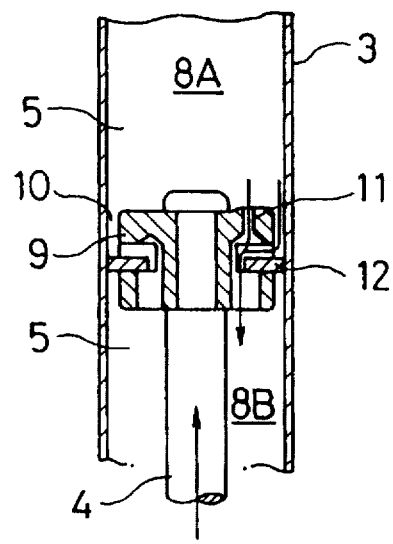
FIGS. 15A and 15B are partial sectional-views showing the gas springs of FIGS. 13A to 13C or FIGS. 14A and 14B, respectively.
Figure 15B:
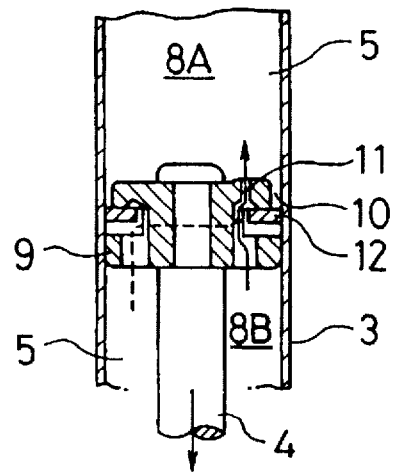
Figure 16:
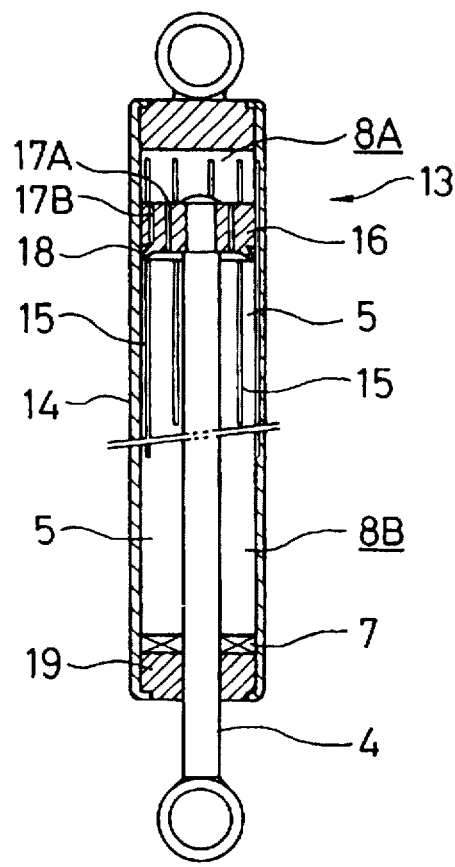
FIG. 16 is a sectional view showing another prior-art gas spring.
Figure 17A:
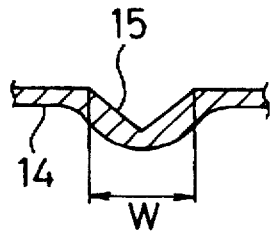
Figure 17B:
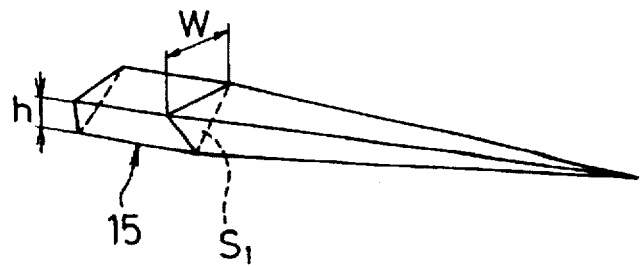

The density of the piston 23, made from the sintered alloy, can be changed to control the extension speed of the piston 23 in the airlock area X of the cylinder 21. In other words, the extension speed of the piston 23 can be set in the airlock area X to a desired value by specifying the density of the piston 23 because the extension speed of the piston 23 in the airlock area X of the gas spring 20 is in inverse proportion to the density of the piston 23, as shown in FIG. 12.

The above embodiment has the following advantages (1) through (5).

(1) Since the cylinder groove 29 is formed to be a square groove having a substantially square cross section with a constant groove width W and a groove depth H gradually reduced toward the airlock area X nearby the stopper 30 of the cylinder 21, the rate of change in sectional area of the transition area from the air damping area Z to the air-damping reduction area Y becomes small. This makes it possible to slow down the damping operation when the piston 23 rushes to the air-damping reduction area Y, and hence to reduce the impact acceleration when rushing to the air-damping reduction area Y in the extending process of the gas spring 20.

Figure 10:
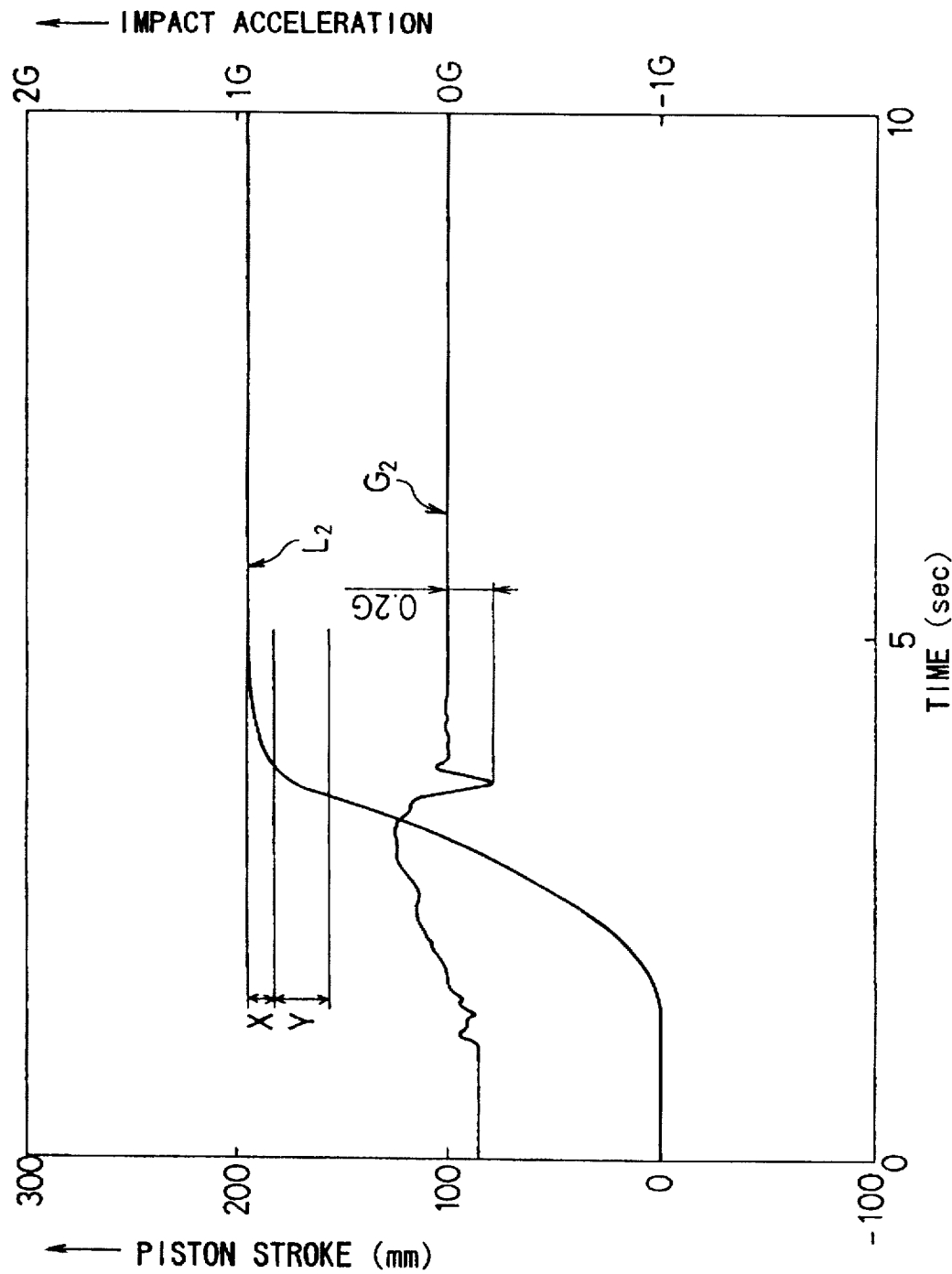
FIG. 10 is a graph showing the relationship between piston stroke, and impact acceleration and time.

(2) When the cylinder 29 is formed to reduce its groove depth H toward the airlock area X nearby the stopper 30 of the cylinder 21 while bending along the axial direction of the cylinder 21 (bend R), the rate of change in sectional area of the cylinder groove 29 becomes still smaller. For this reason, the damping operation is further slowed down when the piston 23 rushes to the air damping reduction area Y to further reduce the impact acceleration $G_2$ when rushing to the air-damping reduction area Y as shown in FIG. 10.

(3) A comparison of two types of cylinder grooves for use as the cylinder groove 29, one is the square groove having a substantially square cross section and the other is the triangular groove having a triangular cross section, where both sectional areas are made equal with the same groove depth H, shows that a groove width w of the triangular groove is double the width W of the square groove. Since the groove width w of the triangular groove is wider than the width W of the square groove, when an elastic seal member such as an O ring is used to divide and seal up the passage between the chambers at both sides of the piston 23 by setting it in the outer groove of the piston 23, it is easy for the seal member to bite into the triangular groove. In contrast, the use of the square groove having a substantially square cross section as the O-ring 34 does not bite the groove 29 because of its narrow groove width W even if the O-ring 34 is made more elastic. In other words, the cylinder groove 29 of the square shape is never made narrower and therefore the sectional area is not reduced by the O-ring 34, especially in the section 29B, where the groove depth H is reduced gradually, thus generating desired damping force.

(4) Since the piston 23, the oil seal 27 and the rod guide 26 define the airlock chamber nearby the stopper 30 of the cylinder 21, and the damping operation is performed only by the air 25 within the airlock chamber when the gas spring 20 has been fully extended at the end of extending process, the cylinder 21 requires only a very small amount of oil to lubricate the gas seal 27. For this reason, the extension damping force is kept proper independently of the enclosed oil. When the gas spring 20 is the inverted position turning type, the extension speed of the piston 23 and the rod 22 is also kept proper near the turned position, not made more slowly than required, thus performing excellent damping operation only by use of air 25 when the gas spring 20 has been fully extended.

(5) Further, the passage 35 formed in the piston 23 is opened by the O-ring 34 that serves as a check valve in the process of compressing the gas spring 20, so that little or no damping force occurs in this compressing process, thereby compressing the gas spring 20 quickly.

Figure 11A:
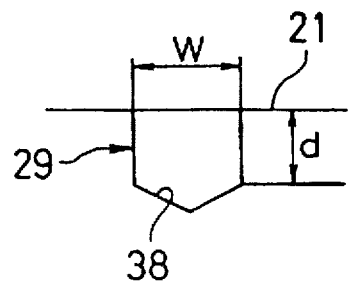
FIGS. 11A and 11B are sectional views showing a modified example of the cylinder groove of FIG. 6.
Figure 11B:
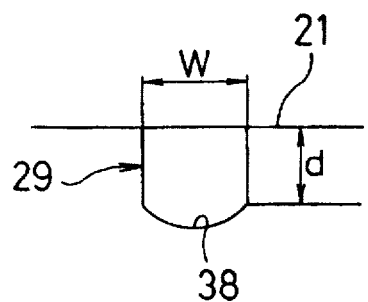

Although the above embodiment described the embodiment in which the cylinder groove 29 is a square groove having a square cross section, as shown in FIG. 11, the groove shape may be a triangle (FIG. 11A) such that the bottom 38 of the cylinder groove 29 is made triangular with the width W kept constant in a range of a groove depth d, or an arc (FIG. 11B). Namely, when the piston 23 rushes from the air-damping area Z into the air-damping reduction area Y, the sectional area of the cylinder groove 29 in the air-damping reduction area Y may be formed such as to be reduced in a primary proportion, and the bottom 38 of the cylinder groove 29 may be formed in any shape.

The above embodiment also teaches that the reaction force of the gas occurs within the piston-side chamber 28A in the process of extending the gas spring 20 to generate the assisting force to the piston 23 and the rod 22, but the assisting force may be generated to the piston 23 and the rod 22 by a force of a coil spring.

Further, the second flange 32B with the notch 33 may be formed separately from the piston 23, or a piston ring may be used instead of the O-ring 34. Furthermore, if the outer piston 23 and the inner cylinder 21 are made airtight at the outer edge of the piston 23 itself, the O-ring 34 or piston ring will no longer need to be set in the piston 23.

It is also not necessary in the piston 23 to provide the passage 35 and the O-ring 34 that serves as a check valve. In this case, the cylinder groove 29 on the inner surface of the cylinder 21 causes the extension damping force in the process of extending the gas spring 20, or in the process of compressing the gas spring 20, it causes compression damping force having the same value as the extension damping force.

Although the above embodiment described the case wherein the piston 23 is made from sintered alloy, the concept is not limited by the embodiment and any porous piston can be used as long as it has open pores for communicating between the chambers 28A and 28B provided at both sides of the piston 23.

Furthermore, although the above embodiment described the gas spring 20 of inverted position turning type, the gas spring 20 may be also used as a gas spring of inverted force type.

As described above, according to the present invention, there is provided a gas spring capable of slowing down the damping operation when the piston has been fully extended to reduce the impact when being fully extended.

While the preferred embodiments of the invention have been described in detail with reference to the drawings, they are by no means limitative, and various changes and modifications are possible without departing from the scope and spirit of the invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. An extendable and compressionable gas spring comprising:

a hollow, elongate cylinder in which a seal and a guide member is contiguously arranged in an opening provided at one end of the cylinder for enclosing a gas therein, the other end of the cylinder being closed, the cylinder having an inner surface and an outer surface, said cylinder including an annular recession in said outer surface near said one end, thereby forming a stopper within said cylinder for stopping movement of a piston therein, said cylinder further including a cylinder groove formed by externally extending said inner cylinder surface in an axial direction of the cylinder, said groove extending between a pair of terminal ends, said cylinder defining three operating areas along the length of said cylinder in a direction from said closed end towards said stopper,

- a first area corresponding to an air-damping area, wherein said cylinder groove has a substantially square cross-section with a constant width and depth, said air-damping area terminating at said cylinder groove terminal end nearest said closed end,
- a second area corresponding to an air-damping reduction area, wherein said cylinder groove has a substantially square cross-section with a constant groove width and a changing groove depth, said groove depth becoming shallower in a direction from said closed end toward said stopper, said cylinder groove in said air-damping reduction area terminating at said terminal end nearest said stopper,
- a third area corresponding to an airlock area, wherein said airlock area is defined as the area of the cylinder extending between said stopper and said terminal end of said groove located within said air-damping reduction area, said airlock area free of said cylinder groove;
- a rod having a piston attached to one end thereof, said rod extending through the seal and guide members and slidably movable such that said piston travels within said cylinder between said closed end and said stopper, a movement of said rod and piston towards said closed cylinder end corresponding to a spring compression and movement towards said stopper corresponding to a spring extension, said piston dividing the cylinder into a rod-side chamber and a piston-side chamber, said piston a unitary member formed from a porous sintered alloy having open pores therein and defined by an outer peripheral edge, said piston including at least one passage formed between the inner surface of the cylinder and the outer edge of the piston for communicating the gas between each of the chambers on either side of the piston, said piston including an annular groove formed around the outer periphery, said annular groove intersecting said at least one passage and receiving therein an O-ring as a check valve for opening and closing said at least one passage during the spring compression and extension movements, wherein when said rod and piston is adapted to undergo spring compression, said check valve is in said open position, whereby gas within said piston-side chamber is simultaneously communicated under no damping force to said rod-side chamber through said at least one passage and said cylinder groove, and whereby when said rod and piston is adapted to undergo spring extension, said check valve is in said closed position, wherein gas within said rod-side chamber is communicated under a variably decreasing damping force to said piston-side chamber, wherein when said piston is in said air-damping area, said communication of gas occurs only through said cylinder groove such that said gas communicated in said piston-side chamber assists said spring extension into said air-damping reduction area, whereby said piston is gradually decelerated upon said piston travels through said air-damping reduction area into said airlock area, whereby when said piston is in said airlock area, said gas is solely communicated from said rod-side chamber to said piston-side chamber through said piston pores without said piston experiencing a damping rebound shock, said spring fully extended when said piston is in contact against said stopper.

2. The gas spring as set forth in claim 1, wherein said check valve is an O-ring.

* * * * *